United States Patent
Noriega Perez

(10) Patent No.: US 10,844,261 B2
(45) Date of Patent: *Nov. 24, 2020

(54) METHOD OF HEAT TRANSFER BETWEEN A METALLIC OR NON-METALLIC ITEM AND A HEAT TRANSFER FLUID

(71) Applicant: ArcelorMittal, Luxembourg (LU)

(72) Inventor: David Noriega Perez, Oviedo Asturias (ES)

(73) Assignee: ArcelorMittal, Luxemborg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 16/064,720

(22) PCT Filed: Dec. 20, 2016

(86) PCT No.: PCT/IB2016/001779
§ 371 (c)(1),
(2) Date: Jun. 21, 2018

(87) PCT Pub. No.: WO2017/109558
PCT Pub. Date: Jun. 29, 2017

(65) Prior Publication Data
US 2019/0002749 A1    Jan. 3, 2019

(30) Foreign Application Priority Data
Dec. 22, 2015 (WO) .................. PCT/IB2015/002402

(51) Int. Cl.
| | | |
|---|---|---|
| C09K 5/10 | (2006.01) | |
| B22D 11/124 | (2006.01) | |
| C21D 1/60 | (2006.01) | |
| C21D 1/667 | (2006.01) | |
| C21D 1/56 | (2006.01) | |
| C21D 1/00 | (2006.01) | |

(52) U.S. Cl.
CPC ........... C09K 5/10 (2013.01); B22D 11/1245 (2013.01); C21D 1/56 (2013.01); C21D 1/60 (2013.01); C21D 1/667 (2013.01); *C21D 1/00* (2013.01)

(58) Field of Classification Search
CPC ...... C09K 5/10; C09K 5/063; B22D 11/1245; C21D 1/60; C21D 1/56; C21D 1/667; C21D 1/00
USPC ......................................................... 252/71
See application file for complete search history.

(56) References Cited

U.S. PATENT DOCUMENTS

| | | | | |
|---|---|---|---|---|
| 8,222,190 B2 * | 7/2012 | Zhamu | ................ | C10M 103/02 |
| | | | | 508/113 |
| 8,834,739 B1 | 9/2014 | Cumberland et al. | | |
| 9,679,674 B2 * | 6/2017 | Ramon Raygoza | ... | B82Y 30/00 |
| 2002/0100578 A1 * | 8/2002 | Withers | ................ | B82Y 30/00 |
| | | | | 165/80.4 |
| 2005/0258394 A1 | 11/2005 | Bacher et al. | | |
| 2005/0269547 A1 | 12/2005 | Ohira et al. | | |
| 2007/0210277 A1 * | 9/2007 | Torigoe | .................... | C09K 5/10 |
| | | | | 252/70 |
| 2008/0197318 A1 * | 8/2008 | Morita | ..................... | C09K 5/10 |
| | | | | 252/74 |
| 2008/0302998 A1 * | 12/2008 | Hong | ....................... | C09K 5/10 |
| | | | | 252/74 |
| 2009/0065107 A1 | 3/2009 | Ho et al. | | |
| 2009/0286075 A1 | 11/2009 | Nakamura et al. | | |
| 2009/0288743 A1 | 11/2009 | Ho et al. | | |
| 2011/0001081 A1 * | 1/2011 | Singh | ....................... | C09K 5/08 |
| | | | | 252/73 |
| 2011/0220841 A1 * | 9/2011 | Zheng | ...................... | C09K 5/06 |
| | | | | 252/71 |
| 2011/0274888 A1 * | 11/2011 | Tang | ................. | C04B 35/63452 |
| | | | | 428/189 |
| 2012/0006509 A1 | 1/2012 | McCants et al. | | |
| 2013/0341028 A1 | 12/2013 | Christian et al. | | |
| 2014/0312263 A1 | 10/2014 | Timofeeva et al. | | |
| 2015/0048272 A1 | 2/2015 | Rai et al. | | |
| 2015/0225819 A1 | 8/2015 | Bedworth et al. | | |
| 2016/0045882 A1 * | 2/2016 | Coulombe | ............. | B82Y 30/00 |
| | | | | 252/71 |
| 2018/0371304 A1 * | 12/2018 | Cabanas Corrales | .... | C21D 1/60 |
| 2019/0002750 A1 * | 1/2019 | Noriega Perez | ..... | B22D 11/124 |

FOREIGN PATENT DOCUMENTS

| | | |
|---|---|---|
| CN | 1699497 A | 11/2005 |
| CN | 101415779 A | 4/2009 |
| CN | 102753664 A | 10/2012 |
| CN | 105018041 A | 11/2015 |
| JP | 2009062612 A | 3/2009 |
| JP | 2013028792 A | 2/2013 |

(Continued)

OTHER PUBLICATIONS

Gopalan Ramesh et al, "Review of thermo-physical properties, wetting and heat transfer characteristics of nanofluids and their applicability in industrial quench heat treatment", Nanoscale Research Letters, (Jan. 1, 2011), vol. 6, No. 1, p. 334.

(Continued)

*Primary Examiner* — Douglas J McGinty

(74) *Attorney, Agent, or Firm* — Davidson, Davidson & Kappel, LLC

(57) ABSTRACT

A method of heat transfer between a metallic or non-metallic item and a heat transfer fluid is provided. The method includes a fluid medium and nanoparticles. A thickness/lateral size ratio of the nanoparticles is below 0.00044. The nanoparticles do not include carbon nanotubes.

32 Claims, 2 Drawing Sheets

(56) References Cited

FOREIGN PATENT DOCUMENTS

| RU | 2291889 C2 | 1/2007 | |
|---|---|---|---|
| RU | 2359189 C2 | 6/2009 | |
| WO | WO-2017109525 A1 * | 6/2017 | ............... C09K 5/10 |
| WO | WO-2017109526 A1 * | 6/2017 | ............... C09K 5/10 |
| WO | WO-2017109527 A1 * | 6/2017 | ........... B22D 11/124 |
| WO | WO-2017109560 A2 * | 6/2017 | ............... C09K 5/10 |

OTHER PUBLICATIONS

Haitao et al., "Preparation and thermal conductivity of suspensions of graphite nanoparticles" Carbon, Jan. 2007, pp. 226-228, vol. 45, No. 1, Elsevier, Oxford, GB.

* cited by examiner

METHOD OF HEAT TRANSFER BETWEEN A METALLIC OR NON-METALLIC ITEM AND A HEAT TRANSFER FLUID

The present invention relates to a method of heat transfer between a metallic or non-metallic item and a heat transfer fluid comprising a fluid medium and specific nanoparticles having a specific thickness/lateral size ratio. In particular, it is well suited for steel, aluminum, stainless steel, copper, iron, copper alloys, titanium, cobalt, metal composite, nickel Industries or non-metallic industries such as plastics.

BACKGROUND

With a view of saving energy consumption, it is possible to improve the performance of heat exchangers systems and to introduce various heat transfer enhancement techniques. Some techniques have focused on electric or magnetic field application. Although an improvement in energy efficiency is possible from such points of view, an improvement can also be realized concerning the heat transfer fluid. Usually, fluids such as water, engine oil, ethylene glycol, etc. are used as heat transfer fluid. However, they have poor heat transfer performance and therefore high compactness and effectiveness of heat transfer systems are necessary to achieve required heat transfer. Among the efforts for enhancement of heat transfer, the application of additives to liquids is more noticeable.

For example, a surfactant such as LEVENOL C-421 which is polyoxyethylene mono- and di-glycerides, can be added into water for improving the heat transfer coefficient or at least the thermal conductivity. However, although the conductivity enhances in some cases, the presence of the surfactant results in the formation of foam. The presence of foam is a huge problem since it is really difficult to remove it, in particular in industrial scale. Moreover, the presence of a surfactant increases the corrosion of the heat transfer system, specially the pipe wherein the heat transfer fluid flows. Finally, scale can be formed particularly in the heat transfer system.

Recent investigations in nanotechnology have allowed the development of a new category of heat transfer fluid comprising nanoparticles. Such fluids also called "Nanofluid" are liquid suspension containing particles having at least one dimension below 100 nm. These heat transfer fluids have usually an increased heat transfer coefficient.

The patent application US2014/0312263 discloses a heat transfer fluid comprising a fluid medium and an oxidized form of a material selected from the group of multilayer graphene nanoplatelets. It also discloses a method for manufacturing such fluid. The patent application describes that the oxidation of the multilayered graphene nano-platelets (GnPs) converts $sp^2$ graphite layers on the surface into $OH^-$, $COO^-$ and CO groups. These groups create sufficient electrostatic charge at the nanoplatelet surface that keep the particles separated from each other due to repulsion and prevents particle agglomeration and settling. Thus, a good stability of graphitic nanofluids in a water or ethylene glycol/water base fluid mixtures can be achieved and therefore a good dispersion.

It also discloses that suspensions with unmodified GnPs settle within a few hours. Suspensions stabilized with cationic or anionic surfactants show improvement in stability; however thermal conductivity of those suspensions is below the base fluid due to very low thermal conductivity of organic molecules compared to water. Thus, organic surfactants are detrimental for the thermal conductivity for the thermal conductivity of water based suspensions. Therefore, the use of non-surfactant approach to stabilizing dispersions of nanoparticles involves the oxidation of GnP, to clearly separate GnPs to individual nanoplatelets.

Finally, it discloses that oxidation of GnPs reduces the thermal conductivity enhancements in all tested grades. The ratio of heat transfer coefficients ($h_{nf}/h_0$) for the nanofluid ($h_{nf}$) and the base fluid ($h_0$), calculated for different temperatures, shows that the inclusion of graphitic nanoparticles in ethylene glycol/$H_2O$ coolant can provide 75-90% improvement in heat transfer rates when used in laminar flow regime. Heat transfer coefficients in the turbulent flow regime show 30-40% improvement in heat transfer compared to the base fluid.

However, the oxidation or functionalization of GnPs necessitates an additional step in the process for the manufacture of the heat transfer fluid using strong acids, for example a mixture of concentrated sulfuric and nitric acids as in US2014/0312263. In industrial scale, this oxidation reaction produces waste products being difficult to manage. Additionally, this heat transfer fluid does not reach very high performance. For example, in steel making industry, during the cooling process in a hot rolling process, the run-out table cools the steel strip from approximately 800-950° C. at the entrance to 450-600° C. at the exit. Thus, for some steel grades, a heat transfer fluid having high heat transfer coefficient is needed.

SUMMARY OF THE INVENTION

An object of the present invention provides an easy to implement method of heat transfer between a metallic or non-metallic item and a heat transfer fluid wherein the heat transfer fluid has a high heat transfer coefficient. The present invention provides a method of heat transfer between a metallic or non-metallic item and a heat transfer fluid comprising a fluid medium and nanoparticles wherein the thickness/lateral size ratio of such nanoparticles is below 0.00044 and wherein nanoparticles do not comprise carbon nanotubes.

The invention also provides a method for the manufacture of a heat transfer fluid comprising A., the provision of nanoparticles according to anyone of claims 1 to 20, B., the provision of a fluid medium, C., the adjustment of the nanoparticle concentration in order to achieve percolation and D., the mixing of the nanoparticles with the fluid medium.

The invention also provides a heat transfer fluid.

The following terms are defined:

heat transfer fluid comprising nanoparticles (so-called Nanofluid) means a liquid suspension containing particles having at least one dimension below 100 nm, laminar flow means a flow with a Reynolds number below a critical value of approximately 2300, turbulent flow means a flow with a Reynolds number larger than a critical value of about 4000, percolation threshold concentration is the concentration of nanoparticles above which they are connected forming a long-range network. For heat transfer applications, it is suitable that such network connects the hottest part, i.e. the part where the heat starts to flow, of the fluid and the coldest part of the fluid, i.e. the one where the heat is evacuated. In other words, below the Percolation threshold concentration, nanoparticles are not connected. When the Percolation threshold concentration is obtained, the network formed with nanoparticles, having higher thermal conductivity than the fluid medium, allows the heat carriers to take a path with much less thermal resistance, thus enhancing the thermal conductivity of the fluid, and therefore the heat transfer coefficient, vol. % means percentage by volume, wt. % means percentage by weight, graphite nanoplatelets means a multilayered system of graphene sheets having a thickness around between 5 and 20 nm, few layers graphene means a multilayered system of graphene sheets having a thickness between 1 and 5 nm and graphene means a single-atom-thick sheet of hexagonally arranged, bonded carbon atoms, presenting usually a thickness below 1 nm.

Other characteristics and advantages of the invention will become apparent from the following detailed description of the invention.

BRIEF DESCRIPTION OF THE DRAWINGS

To illustrate the invention, various embodiments and trials of non-limiting examples will be described, particularly with reference to the following Figures.

DETAILED DESCRIPTION

The invention relates to a method of heat transfer between a metallic or non-metallic item and a heat transfer fluid comprising a fluid medium and nanoparticles wherein the thickness/lateral size ratio is below 0.00044 and wherein nanoparticles do not comprise carbon nanotubes.

Without willing to be bound by any theory, it seems that when the heat transfer fluid comprising nanoparticles having a thickness/lateral size ratio below 0.00044, the Percolation threshold concentration decreases. Consequently, fewer bridges are formed above percolation threshold concentration resulting in a decrease of viscosity. In addition, it is possible to obtain high thermal conductivity and therefore high heat transfer coefficient with low nanoparticles concentration especially in laminar flow.

According to the invention, the flow of the heat transfer fluid can be in a laminar or turbulent flow regime. In a laminar flow regime, the heat transfer coefficient is proportional to the thermal conductivity. On the contrary, in turbulent flow regime, the heat transfer coefficient depends on a set of thermo-physical properties such as viscosity.

Preferably, the heat transfer fluid comprises nanoparticles having a thickness/lateral size ratio below 0.00043, advantageously between 0.00010 and 0.00040, more preferably, between 0.00015 and 0.00035 or between 0.00020 and 0.00030.

Advantageously, the thickness of nanoparticles is between 1 and 99.99 nm, preferably between 5 to 50 nm and more preferably between 5 to 15 nm.

Preferably, the lateral size of the nanoparticle is between 26 and 50 μm, advantageously, between 35 and 45 μm.

Preferably, the nanoparticle concentration is between 0.01 wt. % and 12 wt. %, advantageously between 2 and 8 wt. % and more preferably between 4 and 7 wt. %.

For example, the nanoparticle can be spherical, elliptical or nanoplatelets.

Figure 1:
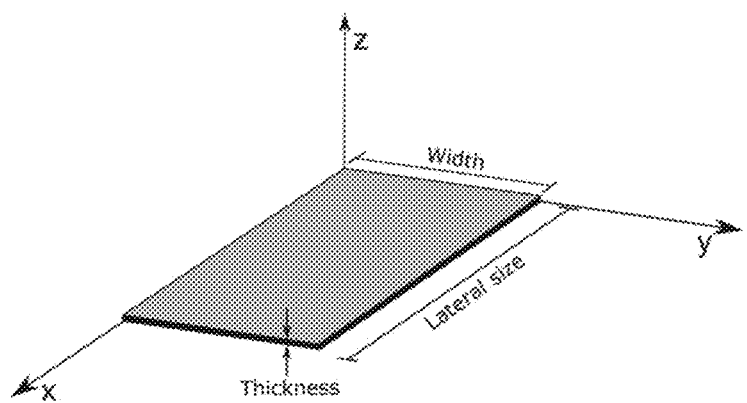
FIG. 1 illustrates an example of one nanoplatelet according to the present invention.

FIG. 1 illustrates an example of one nanoplatelet that can be used in the heat transfer fluid of the present invention. In this example, the lateral size means the highest length of the nanoplatelet through the X axis of FIG. 1 and the thickness means the height of the nanoplatelet through the Z axis. The width of the nanoplatelet is illustrated through the Y axis.

Figure 2:
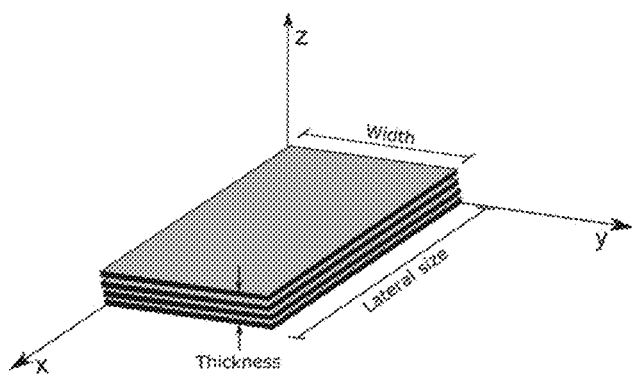
FIG. 2 illustrates an example of multilayered nanoplatelets according to the present invention.

FIG. 2 illustrates an example of multilayered nanoplatelets that can be used in the heat transfer fluid of the present invention. In this example, the lateral size means the highest length of the nanoplatelets through the X axis and the thickness means the total height of all the stacked nanoplatelets through the Z axis. The width of the nanoplatelet is illustrated through the Y axis.

Figure 3:
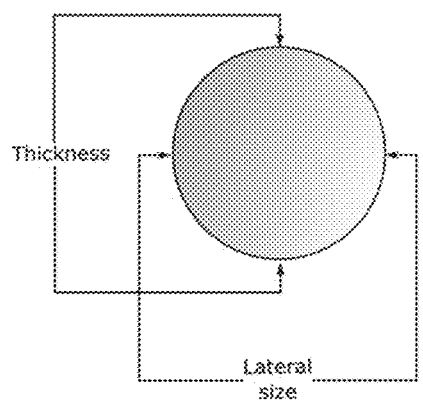
FIG. 3 illustrates an example of spherical nanoparticle according to the present invention.

FIG. 3 illustrates an example of spherical nanoparticle that can be used in the heat transfer fluid of the present invention. In this example, the lateral size means the diameter of the nanoparticle and the thickness means the height of the nanoparticle.

Figure 4:
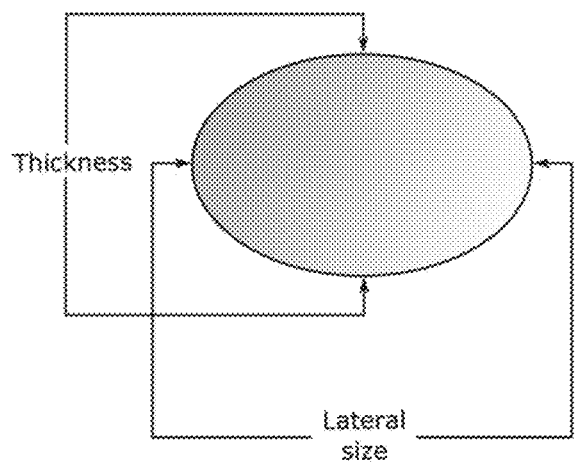
FIG. 4 illustrates an example of elliptical nanoparticle according to the present invention.

FIG. 4 illustrates an example of elliptical nanoparticle that can be used in the heat transfer fluid of the present invention. In this example, the lateral size means highest length of the nanoparticle and the thickness means the height of the nanoparticle.

The lateral size and the thickness of the nanoparticle can be measured by Scanning Electron Microscopy (SEM), Transmission Electron Microscopy (TEM) and Atomic Forces Microscopy (AFM).

In a preferred embodiment, the heat transfer fluid comprises nanoparticles being multilayered nanoplatelets. Indeed, without willing to be bound by any theory, it seems that to obtain nanoplatelets morphology, nanoparticles should have a multilayer structure with weak interaction between layers, i.e. Van der Waals, hydrogen bond, mechanical bond, halogen bond, pi stacking, cation/anion-pi bonds, intercalation, salt bridges and polar-pi. This weak bonding together with a good thermal conductivity of the nanoplatelets raises the possibility of improving heat transfer coefficient of a fluid.

Preferably, nanoparticles are chosen from graphite nanoplatelets, graphene, few layers graphene, $TiO_2$, $ZnO_2$, ZnO, Boron-nitride, copper, silica, montmorillonite, zeolite clipnoptilolite, wollastonite, mica, zeolite 4A, $Al_2O_3$, silicate, pumice and calcium oxide.

In a preferred embodiment, the heat transfer fluid further comprises a dispersing agent. The dispersing agent can be a non-surface active polymer, a surfactant or a mixture thereof. The surfactant can be cationic, anionic, amphoteric or non-ionic.

For example, the dispersant agent can be polyvinnylpyrrolidone, polysaccharides, sulphated polysaccharides, linear alkylbenzene sulfonates, lignin sulfonates, di-alkyl sulfosuccinates, quaternary ammonium compounds, sodium stearate or a mixture thereof.

Preferably, the nanoparticles concentration/dispersing agent concentration ratio in weight is between 3 and 18. More preferably, the nanoparticles concentration/dispersing agent concentration ratio is between 4 and 15, advantageously between 4 and 8 and preferably being between 4 and 6.

Without willing to be bound by any theory, it seems that when the above ratio is controlled and the Percolation threshold concentration reached, the heat transfer fluid according to the invention allows for a higher thermal conductivity and therefore a higher heat transfer coefficient. Indeed, the dispersing agent would be able to avoid deposition and agglomeration of nanoparticles. For instance, if the dispersing agent is a surfactant, the nanoparticle would be enclosed by a micelle consisting in a core of hydrophobic molecules and a shell of hydrophilic molecules. Such micelle structure allows dispersing nanoparticles within the fluid. However to obtain percolation, in other words the formation of the long-range network formed by the nanoparticles, the degree of dispersion of nanoparticles has to be limited.

Preferably, the heat transfer fluid comprises a fluid medium chosen from water, ethylene glycol, ethanol, oil, methanol, silicone, propylene glycol, alkylated aromatics, liquid Ga, liquid In, liquid Sn, potassium formate and a mixture thereof. Gallium, Indium and Tin can be used as heat transfer fluid, in particular for the cooling of a metallic item. Indeed, the melting point of gallium is of 30° C., the one of indium is 157° C. and the one of tin is of 232° C. For example, they can be used to cool down computer chips or laboratory equipments such as neutron sources.

According to the invention, the heat transfer method is between a metallic or non-metallic item and the heat transfer fluid. Preferably, the metallic item, being for example a metallic substrate, is made of aluminum, steel, stainless steel, copper, iron, copper alloys, titanium, cobalt, metal composite, nickel and the non-metallic is made of plastics.

In the prior art, the heat transferring using water as fluid medium can usually be realized by 2 different modes. The first mode is called "non-contact water" which means that water is kept in a circuit without being shot towards the object, off-gases or fluids to cool or to heat. This mode uses indirect cooling or heating systems or non-contact cooling or heating systems, in particular through heat exchangers. The second mode is called "contact water" which means that water is used to cool or heat an object by being in direct contact with it.

According to one preferred embodiment of the invention, the item, being metallic, is a heat exchanger and the heat transfer is realized with a fluid being inside the heat exchanger.

In particular, in the steel making industry, the heat transfer using a heat exchanger can be implemented in coke oven gas treatment, blast furnaces, basic oxygen furnaces, electric arc furnaces, continuous casting, hot-rolling operations, cold-rolling operations, boilers, annealing furnaces and coating, pickling or sinter lines. The cooling in such processes is needed for maintain performance of processing equipment.

According to one preferred embodiment of the invention, the item is a metallic substrate and the heat transfer fluid is directly in contact with it. In this case, the heat transfer can be realized by jet impingement cooling, pool boiling, spray cooling or micro-channel cooling.

For example, in the steel making industry, the heat transfer by contact water cooling can be implemented:

in sprays chambers of continuous casters and hot rolling process such as the cooling process on the run-out table,
In coke ovens for gas treatment and quenching of coke,
during the slag quenching in blast furnaces, basic oxygen furnaces and electric arc furnaces.

The heat transfer fluid is preferably manufactured by the following steps:
A. the provision of nanoparticles according to the present invention,
B. the provision of a fluid medium,
C. the adjustment of the nanoparticle concentration in order to achieve percolation and
D. the mixing of the nanoparticles with the fluid medium.

The heat transfer fluid of the present invention has high heat transfer coefficient and preferably a good dispersion.

The invention will now be explained in trials carried out for information only. They are not limiting.

EXAMPLES

Heat Transfer Coefficient-Laminar Flow

Example 1

Trials 1 to 3 were prepared by mixing graphite nanoplatelets having a thickness/lateral size ratio of 0.00025, 0.001 and 0.005 with water.

For each trial, the thermal conductivity of the samples has been measured employing a DTC-25 thermal conductivity meter. The thermal conductivity enhancement was calculated with respect to the conductivity of water at room temperature, i.e. 20° C., the conductivity of water in such conditions being 0.67 W/mK. Trials 4 to 6 are respectively samples A-GnP, B-GnP and C-GnP having functionalized nanoparticles of the Patent application US2014/0312263. The thickness/lateral size ratio is respectively of 0.001-0.009, 0.0005-0.008, and 0.00044-0.003.

For all the trials, in laminar flow, the heat transfer enhancement is proportional to the enhancement of thermal conductivity, so no calculation is needed to have the heat transfer enhancement in %.

| Trials | Samples | Nanoparticles concentration (wt. %) | Thickness/lateral size ratio | Heat transfer enhancement (%) |
|---|---|---|---|---|
| 1* | 1 | 5 | 0.00025 | 203 |
| 2 | 2 | 5 | 0.001 | 31 |
| 3 | 3 | 5 | 0.005 | 10 |
| 4 | 4 | 5 | 0.001-0.05 | 6 |
| 5 | 5 | 5 | 0.0005-0.008 | 75 |
| 6 | 6 | 5 | 0.00044-0.005 | 85 |

*according to the present invention.

Trial 1 has a high heat transfer enhancement when compared to Trials 2 to 6.

Example 2

Trials 8 and 9 were prepared by mixing graphite nanoplatelets having a thickness/lateral size ratio of 0.00025 and 1 wt. % of polyvinnylpyrrolidone as dispersing agent with water.

The thermal conductivity of the samples has been measured employing a DTC-25 thermal conductivity meter. The thermal conductivity enhancement was calculated with respect the conductivity of water. In laminar flow, the heat transfer enhancement is proportional to the enhancement of thermal conductivity, so no calculation is needed to have the heat transfer enhancement in %.

| Trials | Samples | Nanoparticles concentration (wt. %) | Dispersing agent (wt. %) | $C_{nanoP}/C_{disp}$ ratio | Thickness/lateral size ratio | Heat transfer enhancement (%) |
|---|---|---|---|---|---|---|
| 7* | 1 | 5 | — | — | 0.00025 | 203 |
| 8* | 7 | 7 | 1 | 7 | 0.00025 | 286 |
| 9* | 8 | 10 | 1 | 10 | 0.00025 | 384 |

*according to the present invention

Trials 8 and 9 having a dispersing agent have a higher heat transfer enhancement than Trial 7 without a dispersing agent.

Example 3

The cooling performance of Trials 1 to 9 and Trial 10, consisting of water, was calculated thanks to a modeling software. In this test, a steel slab having a density of 7854 kg/m³ was cooled in laminar flow during 13 seconds. The length was of 5 meter, the width of 1 meter and the slab thickness was of 10 mm.

The initial temperature of the slab was of 968° C. The following table shows the cooling rate by using each Trial:

| Trials | Cooling rate (° C./s) |
|---|---|
| 1* | 36.9 |
| 2 | 26.1 |
| 3 | 22.9 |
| 4 | 22.3 |
| 5 | 32.7 |
| 6 | 34.2 |
| 7* | 36.8 |
| 8* | 46.9 |
| 9* | 54.9 |
| 10 | 21.4 |

*according to the present invention

Trials 1, 7, 8 and 9 have a higher cooling rate than Trials 2 to 6 and Trial 10.

What is claimed is:

1. A method of heat transfer between a metallic or non-metallic item comprising the step of:
    transferring heat between a metallic or non-metallic item and a heat transfer fluid including a fluid medium and nanoparticles, a lateral size of the nanoparticles being between 26 and 50 μm, a thickness/lateral size ratio of the nanoparticles being more than or equal to 0.00015 and less than 0.00044, wherein the nanoparticles do not include carbon nanotubes.

2. The method according to claim 1, wherein the thickness/lateral size ratio is more than or equal to 0.00015 and less than 0.00043.

3. The method according to claim 2, wherein the thickness/lateral size ratio is from 0.00015 to 0.00040.

4. The method according to claim 3, wherein the thickness/lateral size ratio is from 0.00015 to 0.00035.

5. The method according to claim 4, wherein the thickness/lateral size ratio is from 0.00020 to 0.00030.

6. The method according to claim 1, wherein a thickness of the nanoparticles is from 1 to 99.99 nm.

7. The method according to claim 6, wherein the thickness of the nanoparticles is from 5 to 50 nm.

8. The method according to claim 7, wherein the thickness of the nanoparticles is from 5 to 15 nm.

9. The method according to claim 1, wherein a lateral size of the nanoparticles is from 26 to 50 μm.

10. The method according to claim 9, wherein the lateral size of the nanoparticles is from 35 to 45 μm.

11. The method according to claim 1, wherein a nanoparticles concentration is from 0.01 to 12 wt. %.

12. The method according to claim 11, wherein the nanoparticles concentration is from 2 to 8 wt. %.

13. The method according to claim 12, wherein the nanoparticles concentration is from 4 to 7 wt. %.

14. The method according to claim 1, wherein the nanoparticles are multilayered nanoplatelets.

15. The method according to claim 1, wherein the nanoparticles are selected from a group consisting of: graphite nanoplatelets, graphene, few layers graphene, $TiO_2$, $ZnO_2$, ZnO, Boron-nitride, copper, silica, montmorillonite, zeolite clipnoptilolite, wollastonite, mica, zeolite 4A, $Al_2O_3$, silicate, pumice and calcium oxide.

16. The method according to claim 1, wherein the heat transfer fluid includes a dispersing agent.

17. The method according to claim 16, wherein the dispersing agent is a non-surface active polymer, a surfactant or a mixture thereof.

18. The method according to claim 17, wherein the surfactant is cationic, anionic, amphoteric or non-ionic.

19. The method according to claim 18, wherein the dispersing agent is selected from a group consisting of: polyvinnylpyrrolidone, polysaccharides, sulphated polysaccharides, linear alkylbenzene sulfonates, lignin sulfonates, di-alkyl sulfosuccinates, quaternary ammonium compounds and sodium stearate and a mixture thereof.

20. The method according to claim 16, wherein a nanoparticles concentration/dispersing agent concentration ratio in weight is from 3 to 18.

21. The method according to claim 1, wherein the fluid medium is selected from a group consisting of: water, ethylene glycol, ethanol, oil, methanol, silicone, propylene glycol, alkylated aromatics, liquid Ga, liquid In, liquid Sn, potassium formate and a mixture thereof.

22. The method according to claim 1, wherein the heat transfer fluid is in laminar or turbulent regime flow.

23. The method according to claim 1, wherein the item is metallic and is made of aluminum, steel, stainless steel, copper, iron, copper alloys, titanium, cobalt, metal composite or nickel.

24. The method according to claim 1, wherein the metallic item is a heat exchanger and the heat transfer is realized with the fluid being inside the heat exchanger.

25. The method according to claim 1, wherein the metallic item is a metallic substrate and the heat transfer is such that the heat transfer fluid is in direct contact with the metallic substrate.

26. The method according to claim 25, wherein the contact between the metallic substrate and the heat transfer fluid is realized though jet impingement cooling, pool boiling, spray cooling or micro-channel cooling.

27. A method for the manufacture of a heat transfer fluid comprising:
    providing nanoparticles, a lateral size of the nanoparticles being between 26 and 50 μm, a thickness/lateral size ratio of the nanoparticles being more than or equal to 0.00015 and less than 0.00044, wherein the nanoparticles do not include carbon nanotubess;
    providing a fluid medium;
    adjusting a nanoparticle concentration in order to achieve percolation; and
    mixing the nanoparticles with the fluid medium.

28. A heat transfer fluid comprising:
    the heat transfer fluid recited in claim 1.

29. A heat transfer fluid manufactured by the process of claim 27.

30. A heat transfer fluid comprising:
    a fluid medium; and
    nanoparticles;
    a lateral size of the nanoparticles being between 26 and 50 μm,
    a thickness/lateral size ratio of the nanoparticles being more than or equal to 0.00015 and less than 0.00044,
    the nanoparticles not including carbon nanotubes.

31. A method of heat transfer between a metallic or non-metallic item comprising the step of:

transferring heat between a metallic or non-metallic item and a heat transfer fluid including a fluid medium and nanoparticles, a lateral size of the nanoparticles being between 26 and 50 µm, a thickness/lateral size ratio of the nanoparticles being more than or equal to 0.00015 and less than 0.00044, wherein the nanoparticles do not include carbon nanotubes and are selected from a group consisting of: graphite nanoplatelets, graphene, few layers graphene, $TiO_2$, $ZnO_2$, ZnO, copper, silica, montmorillonite, zeolite clipnoptilolite, wollastonite, mica, zeolite 4A, $Al_2O_3$, silicate, pumice and calcium oxide.

32. The method according to claim 1, wherein the thickness/lateral size ratio is 0.00025.

* * * * *